(12) United States Patent
Roberts et al.

(10) Patent No.: US 8,159,628 B2
(45) Date of Patent: Apr. 17, 2012

(54) METHOD OF FASTENING A CIRCUIT ASSEMBLY TO A LIGHT GUIDE IN A MANUFACTURING PROCESS OF A LCD-DISPLAY

(75) Inventors: Tom Roberts, Gulpen (NL); Frans Verweg, Heerlen (NL); Ralph Amory, Lanaken (NL)

(73) Assignee: Chimei Innolux Corporation (TW)

( * ) Notice: Subject to any disclaimer, the term of this patent is extended or adjusted under 35 U.S.C. 154(b) by 327 days.

(21) Appl. No.: 12/415,210

(22) Filed: Mar. 31, 2009

(65) Prior Publication Data

US 2010/0245702 A1    Sep. 30, 2010

(51) Int. Cl.
G02F 1/1333    (2006.01)
(52) U.S. Cl. .......................................... 349/58
(58) Field of Classification Search .................. None
See application file for complete search history.

(56) References Cited

U.S. PATENT DOCUMENTS

| | | | |
|---|---|---|---|
| 7,173,677 B2* | 2/2007 | Kitamura et al. | 349/58 |
| 7,236,217 B2* | 6/2007 | Kotchick et al. | 349/62 |
| 2009/0237592 A1* | 9/2009 | Mizutani | 349/62 |
| 2009/0237596 A1* | 9/2009 | Park et al. | 349/69 |
| 2011/0025947 A1* | 2/2011 | Thompson et al. | 349/62 |

\* cited by examiner

*Primary Examiner* — Sung Pak
(74) *Attorney, Agent, or Firm* — Lowe Hauptman Ham & Berner, LLP (57) ABSTRACT

The invention relates to a method of fastening a circuit assembly to a light guide in a manufacturing process of a LCD-display. The method comprises: a) providing the circuit assembly, comprising at least one light source; b) providing the light guide, arranged to guide light emitted by the at least one light source; c) positioning the light guide and the circuit assembly with respect to each other; and d) fastening the circuit assembly and the light guide to each other. The action d) is performed by laser welding or ultrasonic welding.

11 Claims, 11 Drawing Sheets

METHOD OF FASTENING A CIRCUIT ASSEMBLY TO A LIGHT GUIDE IN A MANUFACTURING PROCESS OF A LCD-DISPLAY

BACKGROUND OF THE INVENTION

1. Field of the Invention

The invention relates to a method of fastening a circuit assembly to a light guide in a manufacturing process of a LCD-display, and a light guide for distributing indirect light in a LCD-display. The invention further relates to a LCD-display and a device.

2. Description of the Related Art

Liquid crystal displays (LCD-displays) are known in the field. A LCD-display comprises a number of pixel elements, usually arranged in a matrix formation, wherein each pixel element may be controlled individually to transmit and/or reflect light or not. By selectively controlling each pixel, together the pixels may form a (moving) image.

Each pixel may be divided in e.g. three sub-pixels, each sub-pixel comprising a different color filter (e.g. red, green, blue), thereby allowing the creation of color images.

The LCD-display may comprise image forming layers, such as a LC-layer comprising an array of liquid crystal elements, two polarizing layers (one on each side of the LC-layer), two electrode layers (one on each side of the LC-layer) arranged to address specific pixels by applying a voltage to the corresponding part of the LC-layer, and a color filter layer to provide different (sub)-pixels with different colors.

The skilled person will understand that other layers and elements may be provided to form a LCD-display. As will be understood, these image forming layers as described so far basically provide a shutter function, i.e. are arranged to transmit and/or reflect or block light, possibly with a certain color, for a specific (sub)-pixel.

To actually form an image, a light source is required. Different types of light sources may be used, such as (possibly used in combination): ambient LCD-displays, that form an image by selectively reflecting ambient light; direct back light LCD-displays, that form an image by selectively transmitting light emitted by a light source positioned behind the image forming layers (as seen from the point of perspective of a viewer); and indirect back light LCD-displays.

Indirect back light LCD-displays use one or more dedicated light source. The light source may be any type of suitable light source, such as a LED (Light Emitting Diode).

The light generated by this light source is distributed evenly over the surface of the image forming layers and travels through the image forming layers or is blocked by the image forming layers to form an image.

The indirect back light LCD displays use light from one or more light sources provided along the edge of the LCD-display, the light being distributed over the image forming layers via a light guide.

In case indirect back light is used, the light guide is positioned behind the image forming layers (seen from a viewer's point of perspective).

Figure 1A:
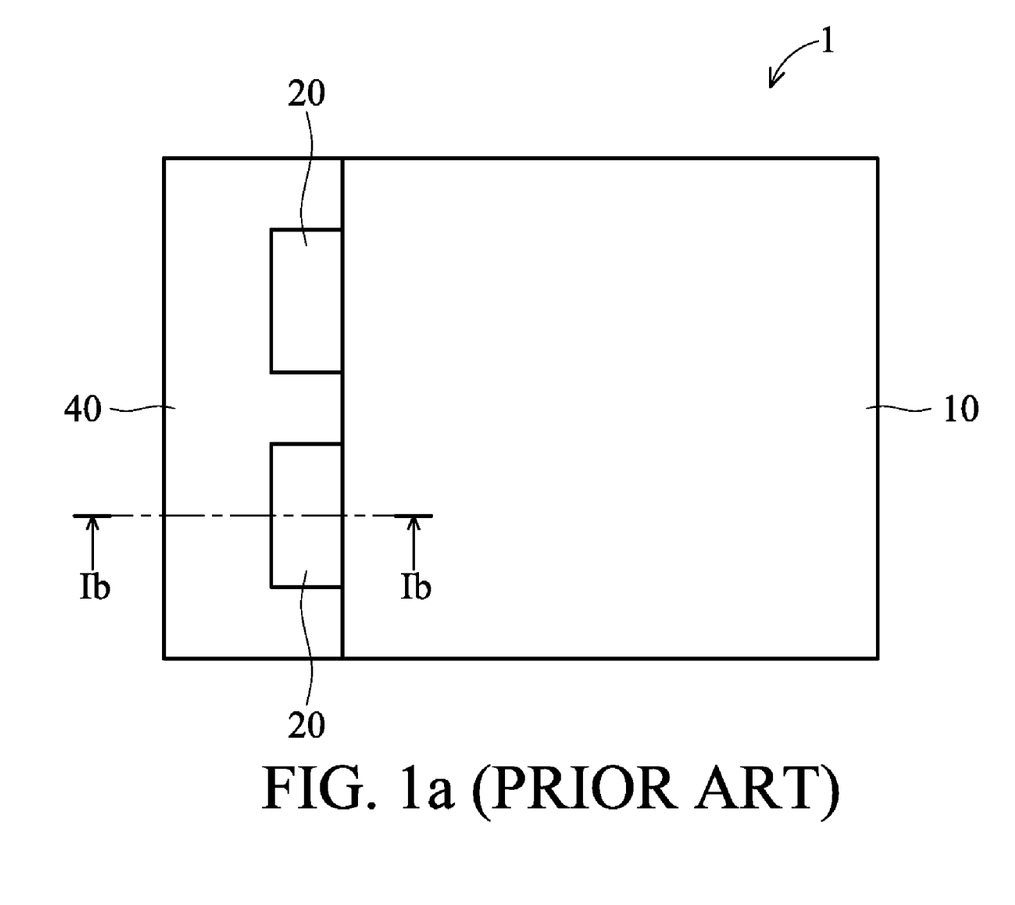
FIGS. 1a-1b schematically show a LCD-display according to the prior art.

An example of a LCD-display using indirect light is shown in FIG. 1a, schematically showing a front view of an indirect back light LCD-display 1 as seen from a users point of perspective, comprising image forming layers 10 and a number of indirect light sources 20 positioned along the edge of the indirect back light LCD-display 1.

FIG. 1a further shows a circuit assembly 40, which may be a flexible printed circuit assembly (FPCA). The circuit assembly is shown in more detail in FIG. 1c. Such a circuit assembly 40 comprises the at least one light source 20 and is further provided with functionality to control the at least one light source 20 and the electrode layers to address specific pixels by applying a voltage to the corresponding part of the LC-layer. The circuit assembly 40 may further be arranged to receive an image signal based on which the control function can be performed.

Figure 1B:
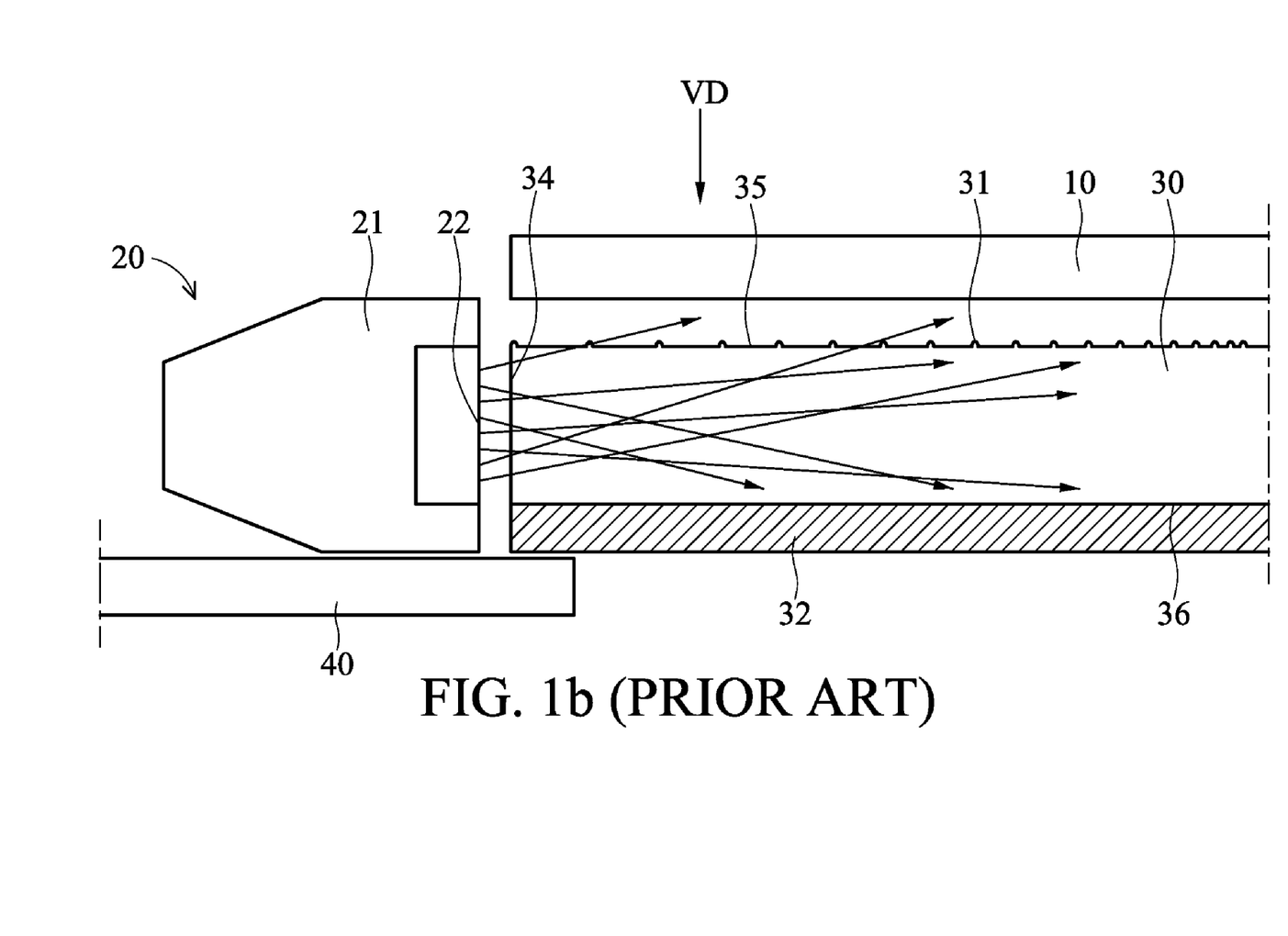

FIG. 1b shows a cross-sectional view of an indirect back light LCD-display 1, as shown in FIG. 1a. In FIG. 1b a normal viewing direction of a user is indicated by arrow VD.

FIG. 1b schematically depicts a cross sectional view of an indirect back light LCD-display 1. The figure shows a light source 20, here used as an indirect back light source, emitting light into a light guide 30 which distributes the light to image forming layers 10. The light source 20 may be provided in a housing 21.

The light guide 30 comprises a first side 35 facing the image forming layers 10 and a second side 36, opposite the first side 35. The second side 36 may comprise a reflective layer 32 to prevent light loss.

The light guide 30 may be a layer made of plastic, such as poly-carbonate. The light guide 30 may be an optical transparent layer, plate or film (made of e.g. poly-carbonate), in which light is transported which enters the light guide 30 at an in-coupling side 34, which is facing a light emission window 22 of the light source 20.

The light guide 30 may comprise an out-coupling structure 31, provided on the first side 35, facing the image forming layers 10. The out-coupling structure 31 may be a structure formed by out-coupling features, such as prisms, dots or any other kind of surface corrugation which enables the out-coupling of light from the light guide 30. By varying the density of these out-coupling features, an even light distribution can be obtained.

Figure 1C:
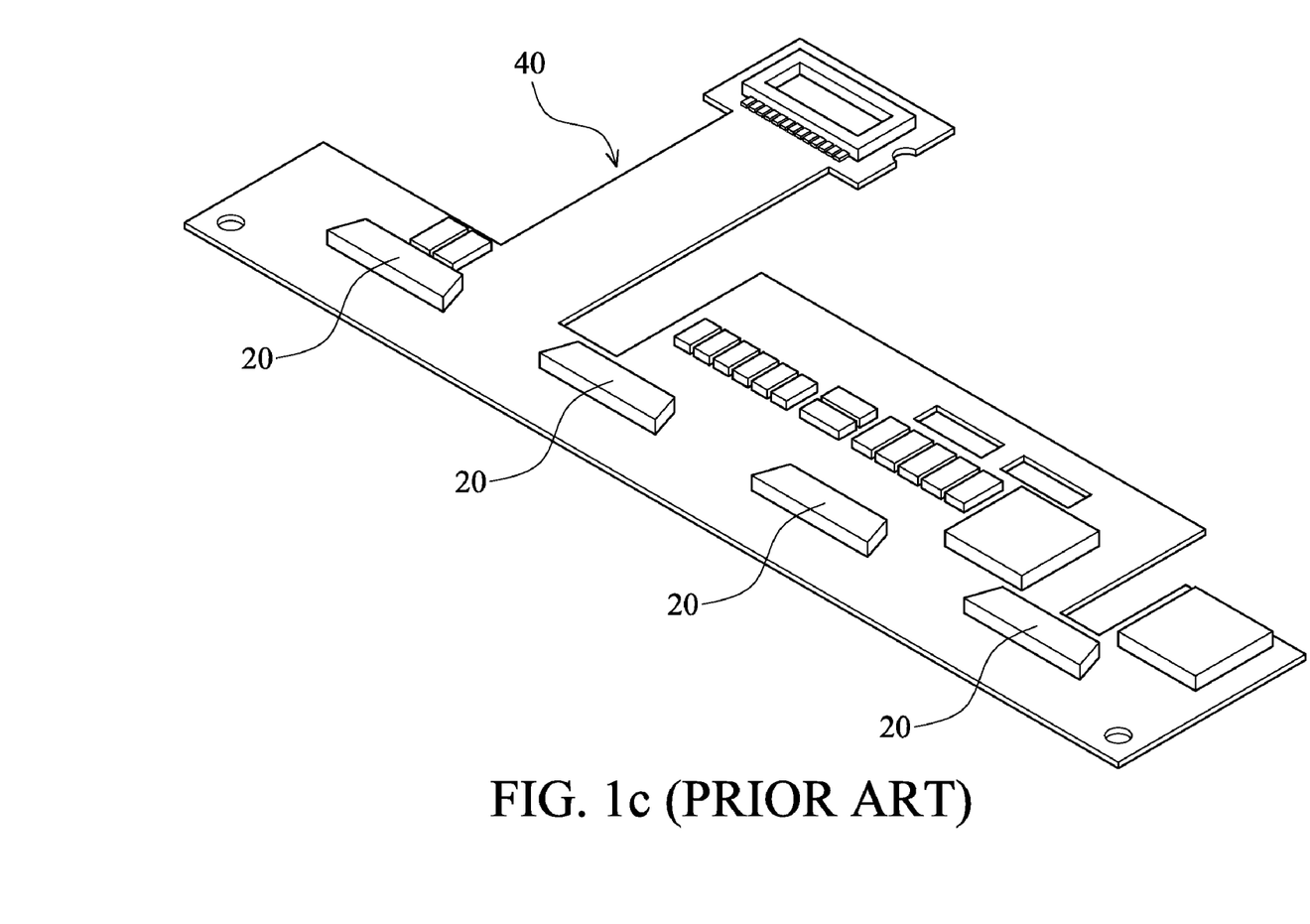
FIGS. 1c-1d schematically show a circuit assembly and a light guide according to the prior art.
Figure 1D:
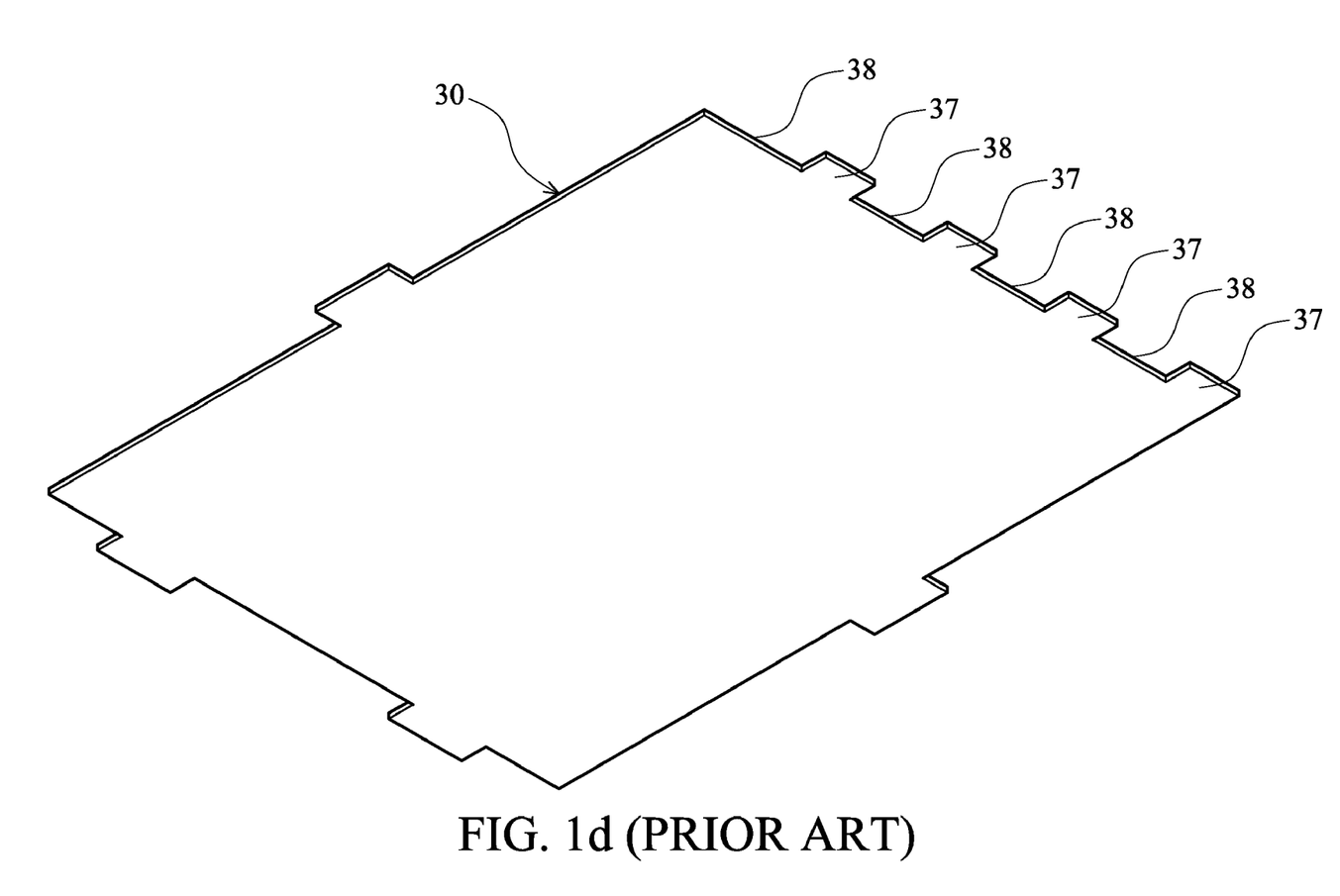

FIG. 1d shows a light guide 30. As can be seen in FIG. 1d, the light guide 30 may be provided with a serrated edge, comprising recesses 38 and protrusions 37. The recesses 38 and protrusions 37 may be arranged to engage with the housings 21 of the light sources 20.

It will be understood by a skilled person that the image forming layers 10 may be used to generate an image. The electrode layers are used to apply a voltage over the liquid crystal layer, where a different voltage may be applied per pixel of the image to be formed. The voltage influences the orientation of the liquid crystal molecules.

Light traveling through the image forming layers will be polarized by a first polarizing layer. Next, the light passes through the liquid crystal layer where its direction of polarization may be altered by the liquid crystal layer depending on the orientation of the liquid crystal molecules (and thus the applied voltage). Next, the light meets a second polarizing layer. Depending on the polarization direction of the light when leaving the liquid crystal layer, the light will be able to (partially) pass the second polarizing layer. This allows controlling the light intensity for each pixel individually, thereby allowing forming an image.

The color filter layer may be arranged to provide a certain pixel with a certain color. The color filter may be omitted in case of a black-and-white liquid crystal display.

A step in the manufacturing process of a LCD-display is to fasten the circuit assembly 40, comprising the light sources 20, to the light guide 30.

The market drives the reduction of the "dead volume" and more in particular the thickness of LCD-displays. As a consequence the light guide 30 and light sources 20 are becoming thinner. Furthermore, the alignment and fixation between the circuit assembly 40 comprising the light sources 20 and the light guide 30 are becoming more critical.

A known technique to fasten the circuit assembly 40 comprising the light sources 20 to the light guide 30 is to use double sided adhesive tape. However, adhesive tape has a certain thickness which is becoming more and more disadvantageous for use in relatively thin LCD-displays. Also, the adhesive quality of adhesive tape may deteriorate under the influence of time and climate.

Another known technique to fasten the circuit assembly 40 comprising the light sources 20 to the light guide 30 is to use glue. However, applying glue in the manufacturing process is a cumbersome process step. Also, using glue in the manufacturing process may contaminate the manufacturing environment.

BRIEF SUMMARY OF THE INVENTION

Therefore, it is an object to provide an improved method of manufacturing a LCD-display.

According to an aspect there is provided a method of fastening a circuit assembly to a light guide in a manufacturing process of a LCD-display, the method comprising: a) providing the circuit assembly, comprising at least one light source; b) providing the light guide, arranged to guide light emitted by the at least one light source; c) positioning the light guide and the circuit assembly with respect to each other; and d) fastening the circuit assembly and the light guide to each other, characterized by that action d) is performed by laser welding or ultrasonic welding.

According to an aspect there is provided a light guide for distributing indirect light in a LCD-display, the light guide comprising a serrated edge formed by recesses and protrusions, the light guide further comprising cover parts covering recesses.

According to an aspect there is provided a device comprising such a light guide.

According to an aspect there is provided a LCD-display comprising a light guide and a circuit assembly that are fastened to each other by a laser weld or an ultrasonic weld.

A detailed description is given in the following embodiments with reference to the accompanying drawings.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

According to the embodiments described below with reference to FIGS. 2a-b, 3a-c and 4a-b there is provided a method using laser welding or ultrasonic welding to fasten a light guide 30 to a circuit assembly 40. Using laser welding or ultrasonic welding provides a cost efficient way of fastening. Also, laser welding or ultrasonic welding does not add any thickness to the end product, which makes it suitable for use in the production of relatively thin LCD-displays. Furthermore, laser welding or ultrasonic welding provides a robust way of fastening. The presented technology is suitable for high volume production.

Embodiment 1

According to a first embodiment, there is provided a method of fastening a circuit assembly 40 to a light guide 30 in a manufacturing process of a LCD-display, the method comprising: a) providing a circuit assembly 40, comprising at least one light source 20; b) providing a light guide 30, arranged to guide light emitted by the at least one light source 20; c) positioning the light guide 30 and the circuit assembly 40 with respect to each other; and d) fastening the circuit assembly 40 and the light guide 30 to each other, wherein action d) is performed by laser welding or ultrasonic welding.

In order to perform action c) in an easy and smooth way, the light guide 30 may be provided with receiving slots that are arranged to receive the at least one light source 20. As a result, action c) may be performed in a self-aligning way.

Laser welding or ultrasonic welding provides a robust fixation between the circuit assembly 40 and the light guide 30. The weld does not add thickness to the assembly and does not produce any pollution during manufacturing.

Laser welding may be performed by applying a laser beam or the like to a contact area present between two objects, where both objects are made of chemical compatible materials. Two materials are considered chemically compatible when the two materials mix when in liquid form.

The energy of the laser is absorbed in one of the two objects or in both of the two objects in the vicinity of the contact area, creating a temperature increase. As a result, the materials of the two objects will melt on both sides of the contact area. By removing the laser light, the melded materials cool down and are welded together.

Ultrasonic welding is performed by clamping two components together with a relatively high clamping force and applying a high frequent vibration. Special clamping device may be used for this. The high frequent vibration may be applied using a ultrasonic source. As a result, the components will melt together due to high temperature, generated by the friction.

Ultrasonic welding doesn't require adding additional material and therefore does not add thickness to the assembly.

As is further explained in the embodiment below, different ways to fasten the light guide 30 to the circuit assembly 40 by using laser welding or ultrasonic welding are provided.

Embodiment 2

According to an embodiment, further explained with reference to FIG. 2a, there is provided a method of fastening a circuit assembly 40 to a light guide 30 in a manufacturing process of a LCD-display, the method comprising: a) providing a circuit assembly 40, comprising at least one light source 20; b) providing a light guide 30, arranged to guide light emitted by the at least one light source 20; c) positioning the light guide 30 and the circuit assembly 40 with respect to each other; and d) fastening the circuit assembly 40 and the light guide 30 to each other, wherein action d) is performed by laser welding or ultrasonic welding and wherein action d) comprises: providing a foil 50, creating a first contact area (CA-1) between the foil 50 and the light guide 30 and creating a second contact area (CA-2) between the foil 50 and the circuit assembly 40, the foil 50 being chemical compatible with at least part of the light guide 30 and with at least part of the circuit assembly 40 it is in contact with; and applying laser welding or ultrasonic welding to the first and second contact area CA-1, CA-2.

According to a further embodiment, the at least one light source 20 comprises a housing 21, and the second contact area CA-2 is present between the foil 50 and the housing 21 of the at least one light source 20 comprised by the circuit assembly 40.

Figure 2A:
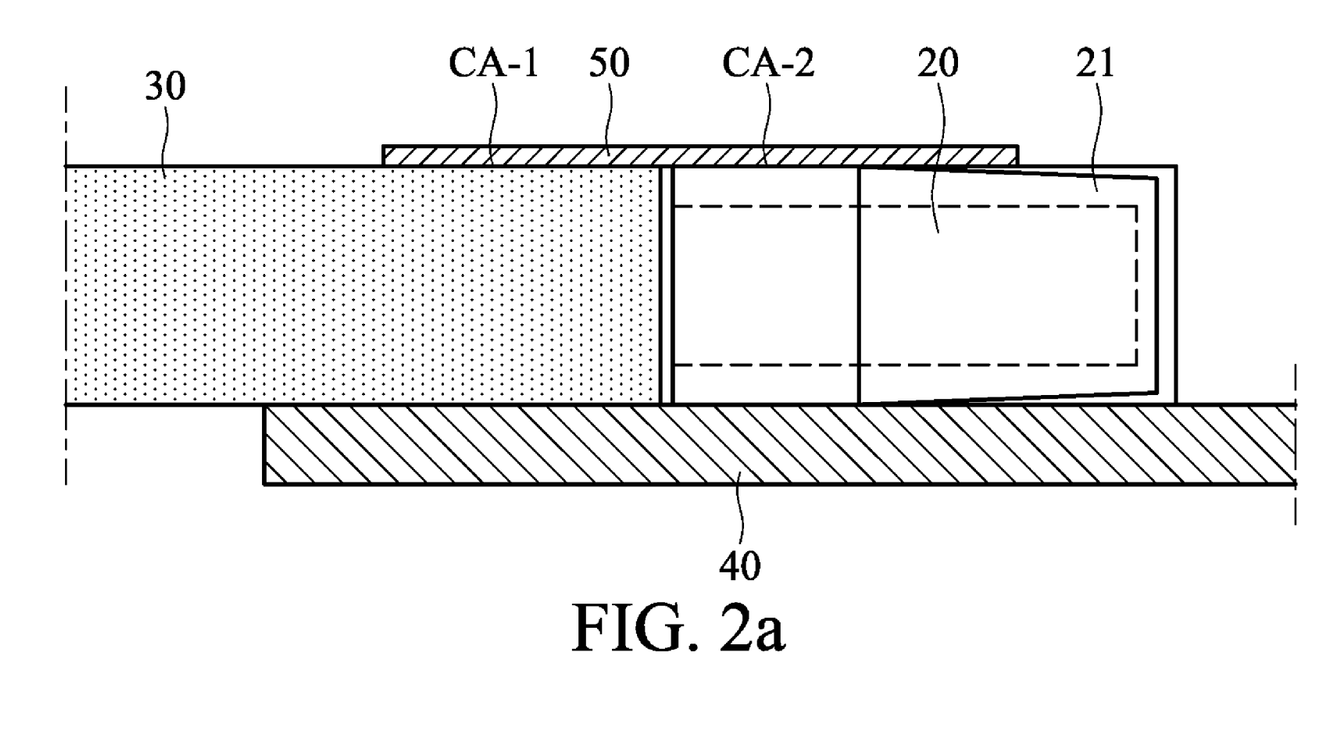
FIGS. 2a and 2b schematically show an embodiment.

FIG. 2a shows the light guide 30 and the circuit assembly 40 after performing a)-d). As can be seen in FIG. 2a, a foil 50 is provided that is in contact with the light guide 30 and the circuit assembly 40, i.e. with a housing 21 of the at least light source 20 comprised by the circuit assembly 40. So, the first and second contact areas CA-1, CA2 may be on a same side of the foil 50.

Figure 2B:
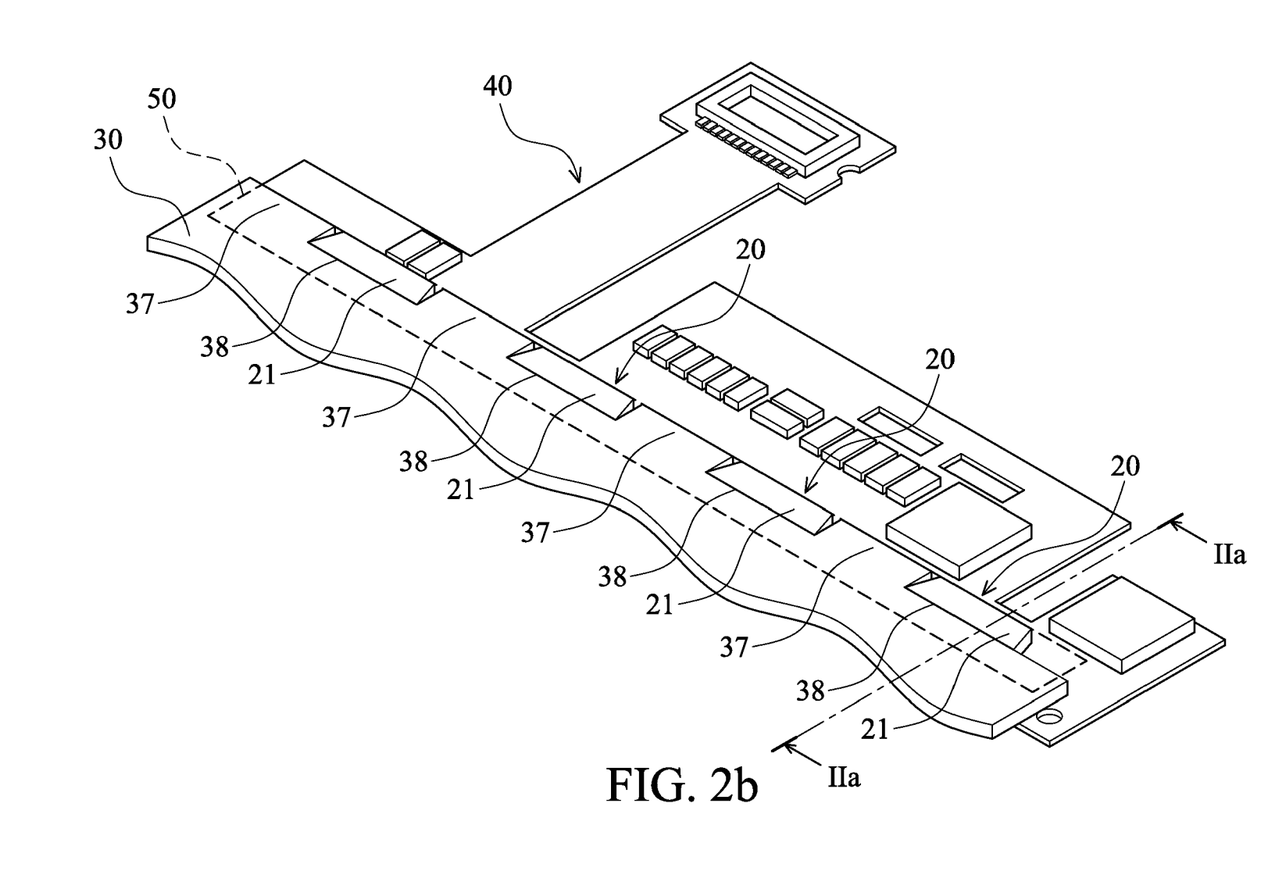

A further example of an assembled light guide 30 and circuit assembly 40 is shown in FIG. 2b, where FIG. 2a shows a cross sectional view of FIG. 2b, as indicated by the cross section line IIa-IIa in FIG. 2b. The foil 50 is indicated by the dashed line. FIG. 2b further shows that the serrated edge (comprising recesses 38 and protrusions 37) engages with the light source 20. Further a frame may be provided, to frame the light guide 30, the circuit assembly 40 and the LC-layers 10 (not shown in the figures).

The foil 50 is made of a material that is chemical compatible with the material of the light guide 30 and the part of the circuit arrangement 40 it is in contact with, such as the housing 21 of the light source 20. For example, the foil 50 can be any plastic material that has a chemical compatibility with the LED (mostly Polyamide) and the light guide. Preferably, the foil 50 can be Polyamide.

According to an example, laser welding is used to connect a light source 20 having a housing 21 made of Polyamide to a 70 µm Polyamide foil 50. In this case, laser welding can be done in accordance with the following parameters:

| | |
|---|---|
| Wave length of the laser | 2 µm |
| Power of the laser | 5 W |
| Contour velocity | 50 mm/sec |
| Time per weld | 0.766 s |
| Double hatch, pitch | 0.2 mm |

The contour velocity is the velocity at which the laser scans the shape of a laser area, e.g. a hatch circle or square.

The foil 50 is provided on top of the circuit assembly 40 (light source 20) and the light guide 30, and is not provided in between circuit assembly 40 and the light guide 30, which may have a negative effect on the alignment and dimension requirements of the assembled product. The foil 50 is positioned in an area where usually enough space is available.

Embodiment 3

According to a further embodiment described with reference to FIGS. 3a-c and 4a-b, a contact area is created between the light guide 30 and the circuit assembly 40. So, instead of using a foil 50, the light guide 30 and the circuit assembly 40 are positioned such that a contact area is created. The laser welding or ultrasonic welding may therefore be applied to this contact area.

According to this embodiment, there is provided a method of fastening a circuit assembly 40 to a light guide 30 in a manufacturing process of a LCD-display, the method comprising: a) providing a circuit assembly 40, comprising at least one light source 20; b) providing a light guide 30, arranged to guide light emitted by the at least one light source 20; c) positioning the light guide 30 and the circuit assembly 40 with respect to each other; and d) fastening the circuit assembly 40 and the light guide 30 to each other, wherein action d) is performed by laser welding or ultrasonic welding and wherein action c) comprises: positioning the circuit assembly 40 with respect to the light guide 30 creating a contact area between the circuit assembly 40 and the light guide 30, and action d) comprises applying laser welding or ultrasonic welding to the contact area.

The contact areas may have an orientation in which its normal is substantially parallel to the viewing direction VD.

The contact area may be created in different ways, as will be further explained below in some further embodiments.

Embodiment 3a

A further embodiment will be explained with reference to FIGS. 3a, 3b and 3c.

Figure 3A:
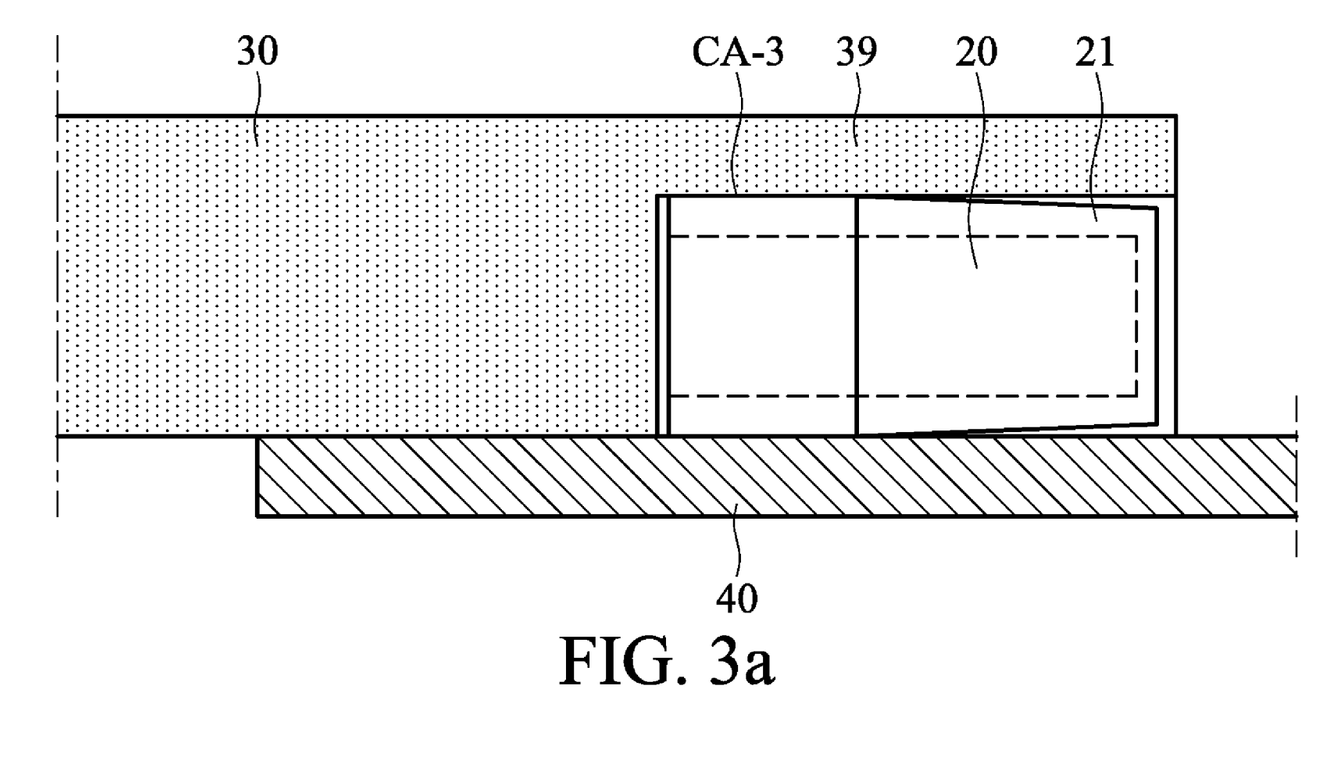
FIGS. 3a-3c schematically show a further embodiment.
Figure 3B:
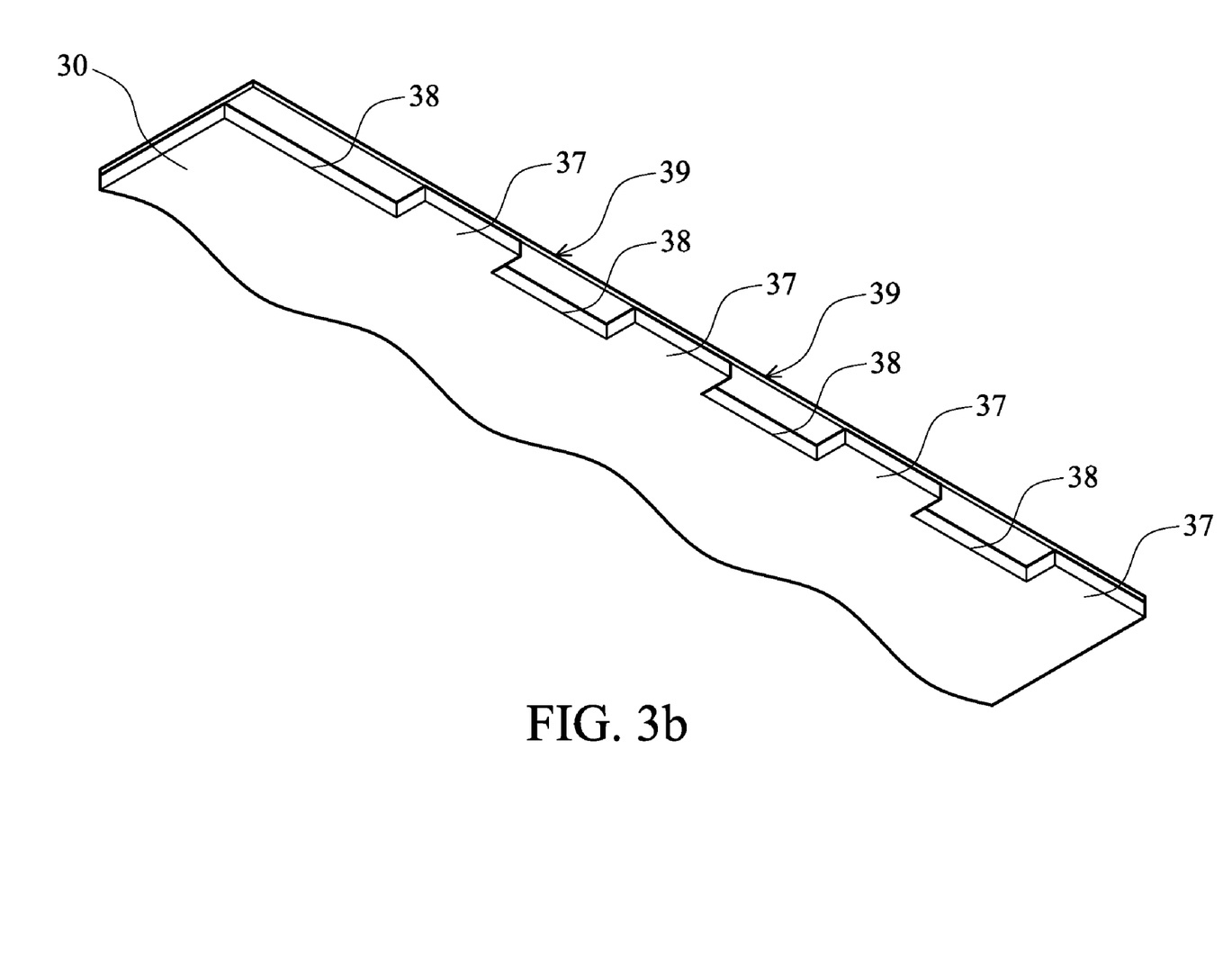

FIG. 3b shows a light guide 30 as already shown in FIG. 1d, now comprising cover parts 39 that are provided in between the protrusions 37 covering the recesses 38. The cover parts 39 are formed in such a way that cavities are formed which, once assembled, engage with the light source 20. In fact, when assembled, the cover parts 39 may be in contact with the housing 21 to create a contact area.

Figure 3C:
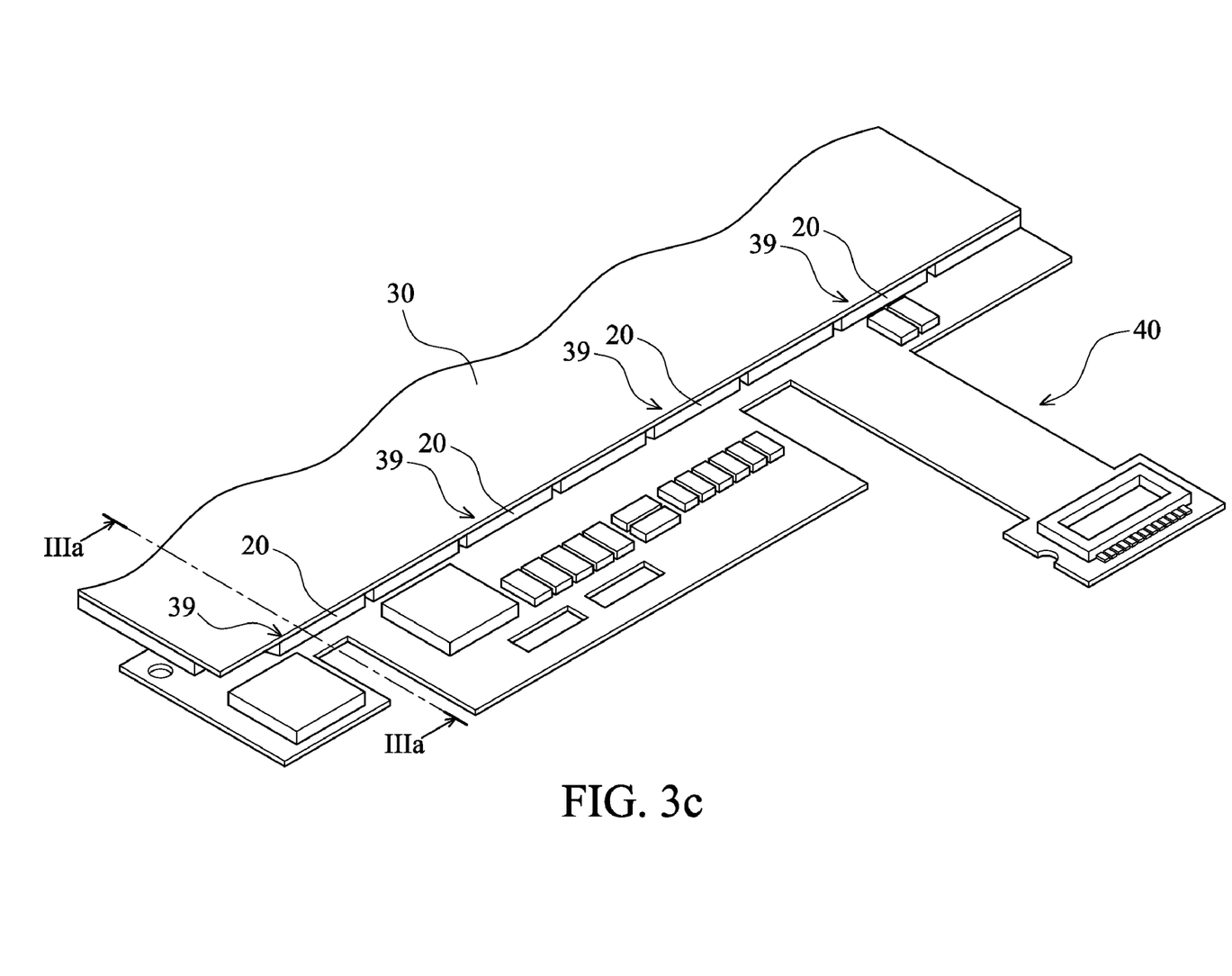

This is clearly shown in FIGS. 3a and 3c, respectively showing a cross sectional view (see cross sectional line IIIa-IIIa in FIG. 3c) and a top view of part of an assembled LCD-display. As can be seen, the light guide 30 comprises cover parts 39 that are in contact with the top part of housing 21, thereby creating a contact area CA-3. Laser welding or ultrasonic welding may be applied to this contact area to fasten the light guide 30 and the circuit assembly 40.

According to this embodiment, there is provided an embodiment, wherein the at least one light source 20 comprises a housing 21 and wherein the light guide 30 comprises a serrated edge formed by recesses 38 and protrusions 37, the light guide 30 further comprising cover parts 39 formed to cover the recesses 38, wherein action c) comprises: positioning the circuit assembly 40 with respect to the light guide 30 creating a contact area CA-3 between the cover parts 39 and the housing 21.

The cover parts 39 have a thickness that may be smaller than the thickness of the light guide 30.

Embodiment 3b

A further embodiment will be explained with reference to FIGS. 4a and 4b.

According to an embodiment, a method of fastening a circuit assembly 40 to a light guide 30 in a manufacturing process of a LCD-display is provided, the method comprising: a) providing a circuit assembly 40, comprising at least one light source 20; b) providing a light guide 30, arranged to guide light emitted by the at least one light source 20; c) positioning the light guide 30 and the circuit assembly 40 with respect to each other; and d) fastening the circuit assembly 40 and the light guide 30 to each other, wherein action c) comprises: positioning the circuit assembly 40 with respect to the light guide 30 creating a contact area CA-4 between the circuit assembly 40 and the light guide 30, and action d) comprises applying laser welding or ultrasonic welding to the contact area CA-4 and, wherein the circuit assembly 40 comprises at least one welding area 41 and the light guide 30 comprises at least one protrusion 37, and wherein action c) comprises positioning the circuit assembly 40 with respect to the light guide 30 such that the contact area is created between the at least one protrusion 37 of the light guide 30 and the at least one welding area 41 on the circuit assembly 40.

The welding areas 41 are formed as part of the circuit assembly 40 and are made of a material that is chemically compatible with the material of the light guide 30.

The light guide 30 may be as shown in FIG. 1d, i.e. it may be a light guide 30 comprising a serrated edge (comprising protrusions 37 and recesses 38).

Figure 4A:
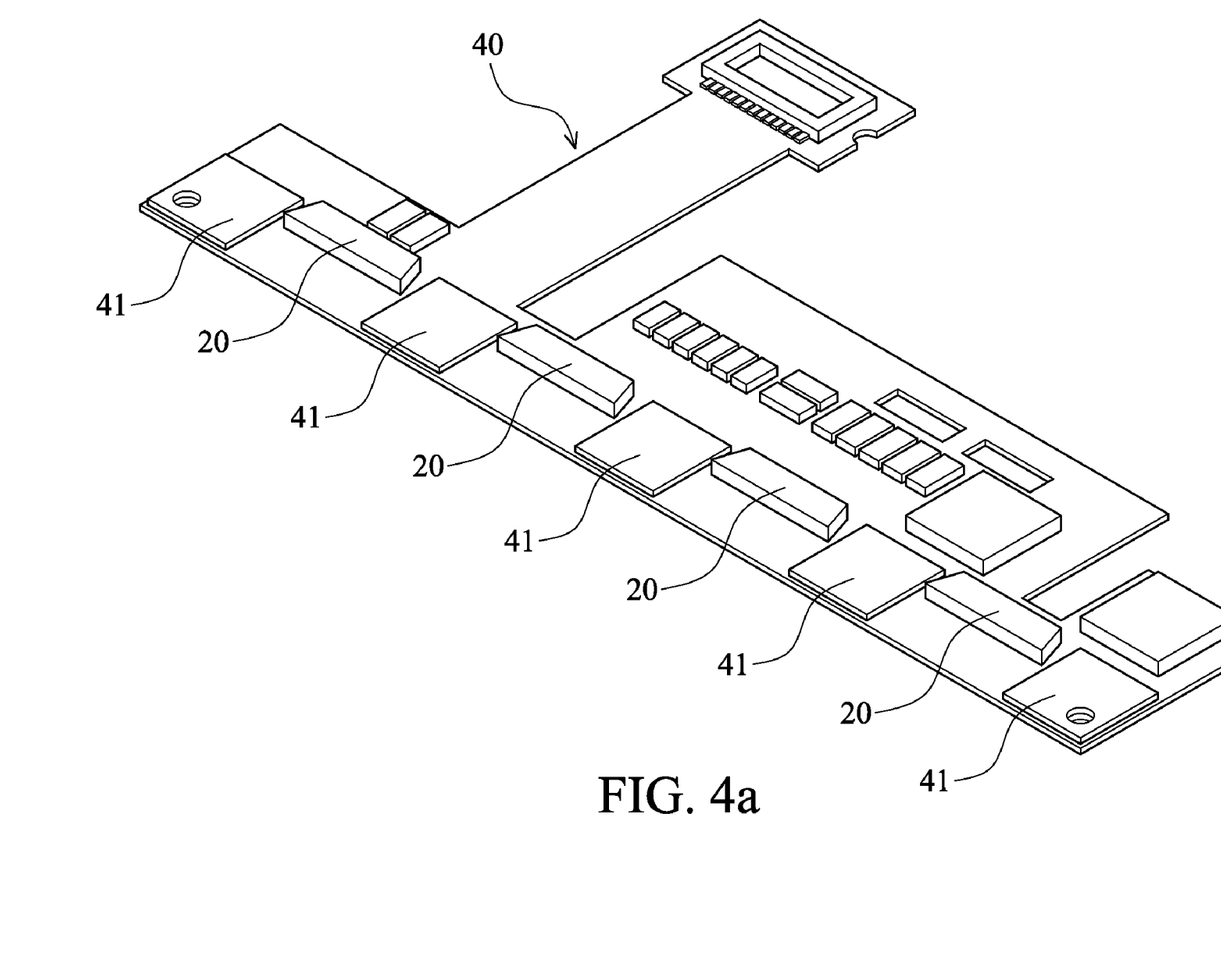
FIGS. 4a-4b schematically show a further embodiment.

The circuit assembly 40 may be as shown in FIG. 4a, being similar to FIG. 1c, but now comprising welding areas 41 in between the light sources 20.

Figure 4B:
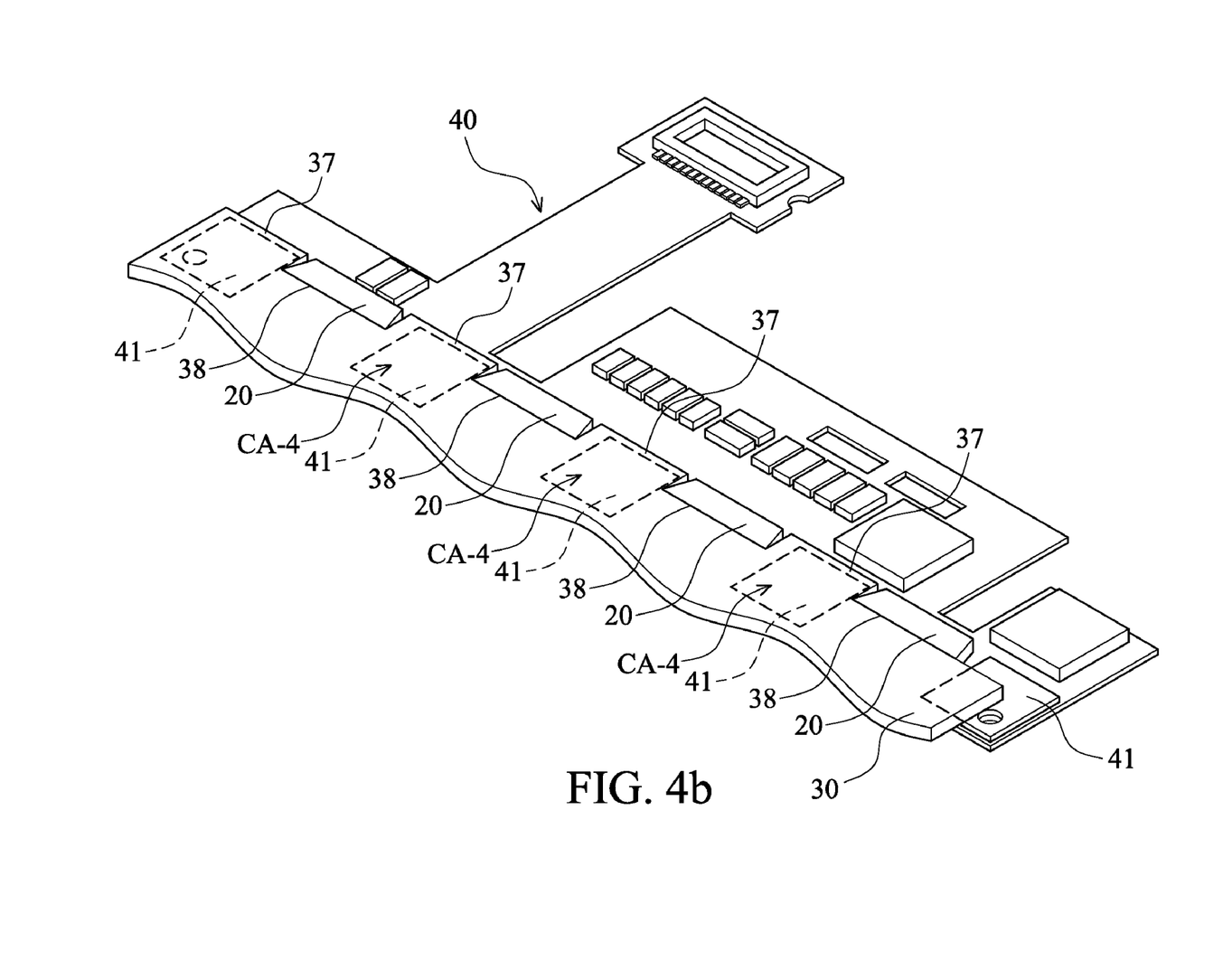

The assembly may be as shown in FIG. 4b. FIG. 4b clearly shows that the protrusions 37 at least partially overlap the welding areas 41, forming contact areas CA-4. The light sources 20 are at least partially positioned in the recesses 38.

So, according to an embodiment, there is provided a light guide 30 for distributing indirect light in a LCD-display, the light guide 30 comprising a serrated edge formed by protrusions 37 and recesses 38, the light guide 30 further comprising cover parts 39 covering recesses 38.

Further Remarks

According to a further embodiment, there is provided a LCD-display comprising a light guide 30 and a circuit assembly 40 that are fastened to each other by a laser weld or an ultrasonic weld.

For instance, the LCD-display comprises a foil 50, further being provided a first contact area between the foil 50 and the light guide 30 and a second contact area between the foil 50 and the circuit assembly 40, the foil 50 being chemical compatible with at least part of the light guide 30 and the circuit assembly 40 it is in contact with, and wherein the foil 50 is fastened to the light guide 30 and the circuit assembly 40 by a laser weld or an ultrasonic weld.

According to a further embodiment the LCD-display is further provided with a contact area between the light guide 30 and the circuit assembly 40, wherein the light guide 30 is fastened to the circuit assembly 40 by a laser weld or an ultrasonic weld. No welding material is needed for these types of welding and no welding material will therefore be present at the contact area.

According to a further embodiment, there is provided a device comprising a light guide as described above or a LCD-display according to the above. The device may be any kind of device, such as a television, a laptop, a computer, a telephone, a handheld, a navigation apparatus, etc.

The above embodiments make use of laser welding or ultrasonic welding in combination with an advanced light guide 30 and/or advanced circuit assembly 40 or in combination with a foil 50. Contact areas are created with materials that are chemically compatible, ensuring a robust laser welding or ultrasonic welding process. These technologies are suitable for high volume production.

Before applying laser welding or ultrasonic welding, the light guide 30 and the circuit assembly 40 are aligned with respect to each other. This alignment could be embedded in the design of the circuit assembly 40 and/or the light guide 30, for instance by means of a serrated edge or an alignment jig. An alignment jig is a tool that may be used to align two or more components with respect to each other, for instance the light guide 30 and the circuit assembly 40. The alignment jig may comprise cavities or ridges where the different parts that are to be aligned can be placed against. The alignment jig is made in such way that if the parts to be aligned are positioned in the alignment jig, the parts are also aligned with respect to each other.

After laser welding or ultrasonic welding of advanced Light Guide and LED housings a robust mechanical connection will be realized and alignment of the LED during life time will be assured.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of fastening a circuit assembly to a light guide in a manufacturing process of a LCD-display, comprising:
   a) providing the circuit assembly, comprising at least one light source;
   b) providing the light guide, arranged to guide light emitted by the at least one light source;
   c) positioning the light guide and the circuit assembly with respect to each other; and
   d) fastening the circuit assembly and the light guide to each other,
   wherein the action d) comprises:
      providing a foil, creating a first contact area between the foil and the light guide and creating a second contact area between the foil and the circuit assembly, the foil being chemically compatible with at least part of the light guide and the circuit assembly with which the foil is in contact; and
      applying laser welding or ultrasonic welding to the first and second contact area.

2. The method as claimed in claim 1, wherein the at least one light source comprises a housing, and the second contact area is present between the foil and the housing of the at least one light source provided on the circuit assembly.

3. The method as claimed in claim 1, wherein the action c) comprises positioning the circuit assembly with respect to the light guide creating a contact area between the circuit assembly and the light guide, and the action d) comprises applying laser welding or ultrasonic welding to the contact area.

4. The method as claimed in claim 3, wherein the at least one light source comprises a housing and wherein the light guide comprises a serrated edge formed by recesses and protrusions, the light guide further comprising cover parts formed to cover the recesses, wherein the action c) comprises positioning the circuit assembly with respect to the light guide creating the contact area between the cover parts and the housing.

5. The method as claimed in claim 3, wherein the circuit assembly comprises at least one welding area and the light guide comprises at least one protrusion, and wherein the action c) comprises positioning the circuit assembly with respect to the light guide, such that the contact area is created between the at least one protrusion of the light guide and the at least one welding area on the circuit assembly.

6. The method as claimed in claim 1, wherein the light guide is provided with receiving slots that are arranged to receive the at least one light source, such that the action c) can be performed in a self-aligning way.

7. A LCD-display, comprising:
   a light guide;
   a foil; and
   a circuit assembly,
   wherein the light guide and the circuit assembly are fastened to each other by a laser weld or an ultrasonic weld, and the LCD-display further is provided a first contact area between the foil and the light guide and a second contact area between the foil and the circuit assembly, and wherein the foil is chemically compatible with at least part of the light guide and the circuit assembly with which the foil is in contact, and the foil is fastened to the light guide and the circuit assembly by the laser weld or the ultrasonic weld.

8. The LCD-display as claimed in claim 7, wherein the foil comprises a plastic material.

9. The LCD-display as claimed in claim 7, wherein the foil comprises polyamide.

10. The LCD-display as claimed in claim 7, further being provided a contact area between the light guide and the circuit assembly, wherein the light guide is fastened to the circuit assembly by the laser weld or the ultrasonic weld.

11. A device, comprising:
the LCD-display as claimed in claim 7.

* * * * *